J. T. IRWIN.
ELECTRICAL INSTRUMENT FOR INDICATING INSTANTANEOUS PRESSURES OR CURRENTS.
APPLICATION FILED DEC. 7, 1917.

1,324,054.

Patented Dec. 9, 1919.

Inventor:-
John Thomas Irwin,
by attorneys
Brown & Seward

UNITED STATES PATENT OFFICE.

JOHN THOMAS IRWIN, OF LONDON, ENGLAND.

ELECTRICAL INSTRUMENT FOR INDICATING INSTANTANEOUS PRESSURES OR CURRENTS.

1,324,054.  Specification of Letters Patent.  Patented Dec. 9, 1919.

Application filed December 7, 1917. Serial No. 206,129.

*To all whom it may concern:*

Be it known that I, JOHN THOMAS IRWIN, a subject of the King of Great Britain, and resident of 16 Farquhar road, Wimbledon Park, London, England, have invented a new and useful Electrical Instrument for Indicating Instantaneous Pressures or Currents, of which the following is a specification.

My invention relates to an improved means of insuring that the deflection of electrical instruments designed to indicate the instantaneous voltage between two points or the current flowing in a circuit shall be at every moment as nearly as possible proportional to these quantities even when the quantities themselves are varying rapidly. It is especially adaptable for use with oscillographs of the electromagnetic type in which a wire or wires are stretched in a magnetic field and in which the movements of the wires are observed by any of the well-known methods. It is also adapted for use with short period electromagnetic instruments such as vibration galvanometers and to electrostatic oscillographs.

Up to the present oscillographs have had their movement damped by immersion in oil or some other viscous fluid so as to damp out more or less completely the free vibrations of the instrument that would otherwise be set up when a sudden change in the current flowing through the instrument occurred. I am also aware that oscillographs have had their deflection damped or controlled by shunting them with a condenser, but both these methods give results that are indefinite, the first on account of the unknown value of the damping force at every moment and the second on account of the free vibrations that will still appear for a suddenly applied change in the current flowing in the circuit except the condenser is very large and the rate of change of the deflection reduced. My improved measuring instrument comprises an oscillograph or the like shunted by a circuit which has a resistance, a condenser and an inductive coil all in series and I arrange that the resonant period of this condenser and inductive coil when closed on themselves shall be equal to the resonant period of the oscillograph with which it is used. This fixes for me the product of the capacity and the inductance.

In the accompanying drawings:—

Thus if L is the value of the inductance and C the value of the capacity then $\frac{1}{LC}=\omega^2$ where $\omega$ is $2\pi$ times the frequency of the oscillograph when vibrating undamped.

The value of the capacity is determined by the degree of damping required thus to make the oscillograph dead beat so that the deflection due to a current of a certain value applied suddenly does not exceed that due to the same current when brought up to this value gradually then the product of the capacity and of the total resistance around the circuit formed by the oscillograph itself and the resonant shunt is a constant. If $R_1$ is the resistance of the oscillograph and $R_2$ is the total resistance of the resonant shunt circuit then the relation $R_1+R_2=\frac{2}{C\omega}$ has to be satisfied to make the electrical circuit dead beat. The ratio of $R_2$ to $R_1+R_2$ depends upon the ratio of the residual damping of the instrument itself including the damping due to the movement of the wires in the magnetic field to the actual damping that would be required to make it dead beat without the resonant shunt, *i. e.*, $$\frac{R_2}{R_1+R_2}=\frac{\text{Mechanical damping actual.}}{\text{Mechanical damping to secure dead beat condition.}}$$

These relations determine the values of the capacity, the inductance and the resistance in the shunt to make the movement of the oscillograph dead beat for any applied current. In some cases I increase $R_1$ artificially and I then also increase $R_2$ in the same ratio so that I can reduce the size of condenser required.

The damping can be made less or greater than that for the dead beat condition by making $R_1$ less or greater than that required for the dead beat condition while $R_2$ is kept constant. These relations follow from the similarity of the equation for the mechanical forces in the oscillograph when it vibrates without any current in its circuit to the equation for the electromotive forces around a closed electric circuit in which there are a condenser an inductive coil and a resistance.

It is evident that if the damping friction is small there will be very little mechanical damping of the oscillograph but since the discharge of the condenser in the shunt circuit through the oscillograph can under the proper conditions given above be in such a direction at every moment as to give an electromagnetic force in the same direction as the frictional force and so produce the dead beat or any other desired condition of damping.

Figure 1:
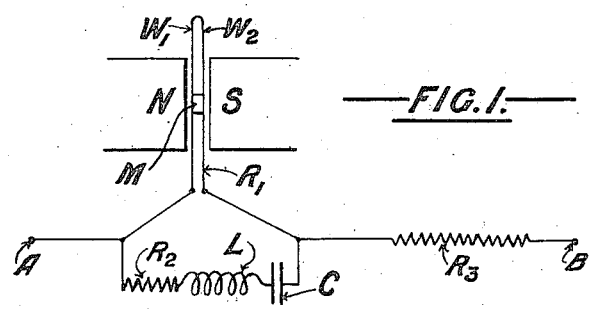
Figure 1 represents, diagrammatically, one form of my improved instrument.

The method so far described is applicable to damping the instrument when employed to measure the voltage between two points A B and where a large non-inductive resistance $R_3$ is placed in series with the shunted instrument so that the current in this circuit is practically proportional to the voltage. This is illustrated diagrammatically in Fig. 1 of the accompanying drawings where a bifiliar oscillograph is shown with its wires $W_1$ $W_2$ and mirror M in a field due to the magnetic poles N S and where $R_1$ is the resistance of the wires and their connections $R_2$ is the resistance, L is the self induction and C the capacity in the shunt circuit and $R_3$ is the series resistance.

When $R_1$ is made large the instrument is over damped and for currents of frequencies nearly of the same order as the resonant frequency of the instrument the deflection is very much reduced.

This can be rectified by shunting the series resistance $R_3$ by a condenser so that the current flowing through the oscillograph and shunt in parallel has a component that varies with the frequency.

Figure 2:
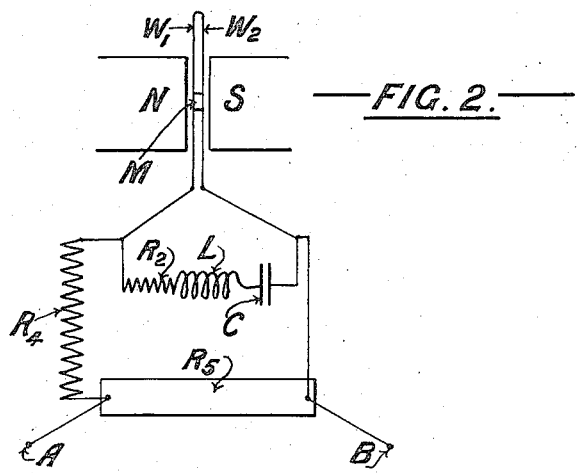
Fig. 2 represents, diagrammatically, a modified form of instrument.

To measure the current flowing in a circuit A B I shunt the oscillograph with the resonant circuit as before described and in series with it I put a non inductive resistance $R_4$. This circuit is then placed across a non inductive shunt $R_5$ placed in the main circuit as in Fig. 2.

As the current from the condenser can now circulate through the main shunt as well as through the oscillograph the damping action is reduced and to make the instrument dead beat I have to increase the resistance $R_1$; the increase of $R_1$ being made equal to $\frac{R_1^2}{R_4-R_1}$ when the shunt in the main circuit is of negligible resistance.

I sometimes overdamp the oscillograph and when so used for current measurements I can get compensation by making the main shunt inductive.

Where the wires of the electro-magnetic instrument have appreciable induction compared with the inductive coil placed in the resonant shunt then I generally reduce the value of the induction of the coil by an equivalent amount. In some few cases to enable the value of the resistance $R_2$ to be increased relative to $R_1$ I introduce a small amount of viscous fluid around the bottom of the wires or I use iron wires instead of the more usual non-magnetic wires.

It is evident that if a polarized electrostatic oscillograph is used to measure the voltage across an electromagnetic instrument shunted by a resonant circuit as described the force on the moving part of the electrostatic oscillograph is proportional to the potential difference on the resistance $R_1$ and this potential difference is proportional to the current flowing in $R_1$ as long as the voltage generated by the movement of the wires is negligible and the resistance $R_1$ is practically non-inductive.

Since the forces on the electrostatic and the electro-magnetic instruments are therefore proportional at every moment if the periods of vibration and the inherent damping of the two instruments are equal the deflection of one instrument will always be proportional to that of the other.

Figure 3:
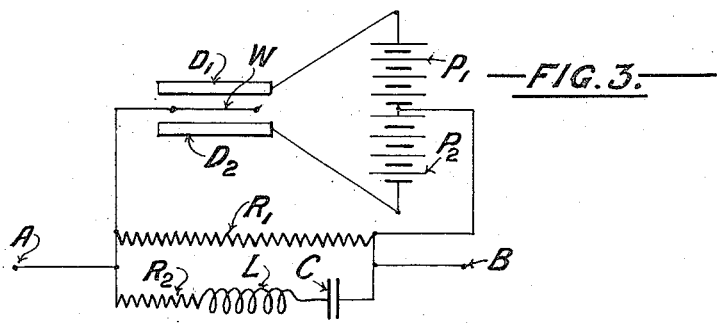
Fig. 3 represents, diagrammatically, another modification of the instrument.

It is evident therefore that this method of damping can be applied to an electrostatic oscillograph but in this case the oscillograph has to be shunted by a non-inductive resistance $R_1$ as well as by the resonant shunt, formed by an inductive coil L a condenser C and a resistance $R_2$ all in series, as shown in Fig. 3 where the electrostatic oscillograph is shown as a wire W stretched between two disks $D_1$ and $D_2$ and where two polarizing batteries $P_1$ and $P_2$ are shown connected in series to keep a constant potential difference between the plates $D_1$ and $D_2$.

It must of course be arranged that the actual current flowing into the electrostatic oscillograph owing to its capacity shall be negligible compared with the current through $R_1$ and in practice this is easy of attainment.

What I claim and desire to secure by Letters Patent of the United States is:—

1. The combination with an oscillograph, comprising a wire stretched in a constant field, of a circuit in parallel with the wire and comprising a capacity, an inductance and a resistance all in series, the product of the capacity and inductance being such that the resonant period of the capacity and inductance when closed on themselves is equal to the resonant period of the oscillograph.

2. The combination with an oscillograph comprising a wire stretched in a constant field, of a circuit in parallel with the wire and comprising a capacity, an inductance, and a resistance all in series, the product of the capacity and inductance being such that the resonant period of the capacity and inductance when closed on themselves is equal to the resonant period of the oscillograph, and the product of the total resistance of the oscillograph and circuit, the capacity and the frequency of the oscillograph is equal to the reciprocal of $\pi$.

3. The combination with an oscillograph, comprising a wire stretched in a constant field, of a non-inductive resistance in series with the wire, a circuit in parallel with the wire and comprising a capacity, an inductance and a resistance all in series, the product of the capacity and inductance being such that the resonant period of the capacity and inductance when closed on themselves is equal to the resonant period of the oscillograph.

4. The combination with an oscillograph, comprising a wire stretched in a constant field, of a non-inductive resistance in series with the wire, a circuit in parallel with the wire, and comprising a capacity, an inductance and resistance all in series, the product of the capacity and inductance being such that the resonant period of the capacity and inductance when closed on themselves is equal to the resonant period of the oscillograph and the product of the total resistance of the oscillograph and circuit, the capacity and frequency of the oscillograph being equal to the reciprocal of $\pi$.

In testimony whereof I have signed my name to this specification in the presence of two subscribing witnesses.

JOHN THOMAS IRWIN.

Witnesses:
   ALFRED S. BISHOP,
   WALTER H. HAILES.